United States Patent [19]

Ohwaki et al.

[11] Patent Number: 4,855,176
[45] Date of Patent: Aug. 8, 1989

[54] ANTI-BLURRING OPTICAL MEMBER

[75] Inventors: Takeshi Ohwaki; Yasunori Taga, both of Nagoya, Japan

[73] Assignee: Kabushiki Kaisha Toyota Chuo Kenkyusho, Aichi, Japan

[21] Appl. No.: 131,356

[22] Filed: Dec. 10, 1987

[30] Foreign Application Priority Data

Dec. 15, 1986 [JP] Japan ................. 61-296747

[51] Int. Cl.⁴ .................. B32B 3/00; B32B 27/14
[52] U.S. Cl. ................. 428/195; 428/206; 428/215; 428/334; 428/336; 428/412; 428/429; 428/432; 428/437; 428/912.2; 350/642; 351/160 H; 427/38
[58] Field of Search ........... 351/160 H; 350/642; 428/195, 206, 215, 334, 412, 429, 432, 437, 912.2; 427/336, 38

[56] References Cited

U.S. PATENT DOCUMENTS 3,895,155  7/1975  Shukuri et al. .......... 428/336
3,925,178  12/1975 Gesser et al. ........... 351/160 H
4,105,821  8/1978  Blaich et al. ........... 428/336
4,481,244  11/1984 Haruta et al. ........... 428/155

Primary Examiner—Ellis P. Robinson
Assistant Examiner—P. J. Ryan
Attorney, Agent, or Firm—Burns, Doane, Swecker & Mathis

[57] ABSTRACT

An anti-blurring optical member for window panes, reflecting mirrors, etc. for use in automobiles, ships and boats, buildings, and so forth, which secures good viewing field by the formation of hydrophilic regions and hydrophobic regions on a visible light transmitting substrate. Both regions are arranged in patterns with a size and interval corresponding to that of water drops.

16 Claims, 2 Drawing Sheets 12  11

22  21

ANTI-BLURRING OPTICAL MEMBER

BACKGROUND

This invention relates to an anti-blurring optical member to be used for window pane, reflecting mirror, etc. in automobiles and other vehicles, ships and boats, air-crafts, and buildings.

In the past, there has been a problem with water droplets adhering onto glass or the like which is used in the window panes and reflecting mirrors in the vehicles, ships and boats, air-crafts, and buildings and thereby deteriorating visibility through it.

In an attempt to eliminate the problem, the art has employed: (1) treatment of the glass surface to render it hydrophobic; and (2) treatment of the glass surface to render it hydrophilic, wherein each of the methods are designed to change the surface energy, in principle.

As to the method for rendering the glass surface hydrophobic, there is, on the one hand, a method, by which an organic silicone type or a fluorine type hydrophobicizing agent is coated on the surface of the optical member by application or spray; and, on the other hand, a method, by which a polymerized film of a fluorocarbon type or a fluorine type is coated on the surface of the optical member by the plasma-polymerization method (see Japanese Patent-Kokoku Publication No. 60-13065). Still further, a method, where the surface of the optical member is reformed by the ion-injection method, has been when the optical member is comprised of an inorganic glass.

There are various methods for treating the glass surface to render it hydrophilic, such as: (1) a method of coating the surface of the optical member with a hydrophilic surfactant, a polyhydric alcohol, or a hydrophilic polymer; (2) a method of coating the surface of the optical member with an inorganic compound such as $MgF_2$, $CaF_2$, $SiO$, and so forth; and (3) a method of subjecting the surface of the optical member to the ion-etching, in the case where the optical member is of inorganic glass; and others. Each of these methods seeks to secure the viewing field by the perfect wetting of the surface of the optical member.

However, the surface of the optical member which has been subjected to the hydrophobic treatment has a maximum contact angle of 110°, hence it does not always repel water drops perfectly therefrom. In the case where water drops are of a large size or they can be easily blown off by wind, the water on the glass surface readily flows, and a good viewing field can be secured. On the contrary, however, when very small drops of water adhere on the glass surface, they would inevitably remain on the glass surface to deteriorate the visibility.

On the other hand, while the surface of the optical member which has been subjected to the hydrophilic treatment has excellent light transmitting property in comparison with a non-treated surface, when water drops adhere on it, it permits a film of water to be formed over the entire surface thereof, and, depending on the kind of film, there may take place a phenomenon such that an image of an object viewed through the optical member is seen deformed. As such, it has occurred that the visibility of an object image through the optical member becomes poor, when very small drops of water covers the surface of the optical member, or when the film of water is formed on the surface of such member.

SUMMARY OF THE DISCLOSURE

It is therefore an object of the present invention to solve the problems described above with the optical members treated by the conventional techniques, and to provide an anti-blurring optical member of an improved quality.

The present invention relates to an anti-blurring optical member wherein at least one hydrophilic region and at least one hydrophobic region are formed on a visible light transmitting substrate. An areal ratio between the hydrophilic region and the hydrophobic region should preferably be in a range of from 1:4 to 4:1.

The foregoing object, other objects as well as specific construction and function of the anti-blurring optical member according to the present invention will become more apparent and understandable from the following detailed description thereof with reference to particular embodiments thereof, when read in conjunction with the accompanying drawing.

DETAILED DESCRIPTION OF PREFERRED EMBODIMENTS

Figure 1:
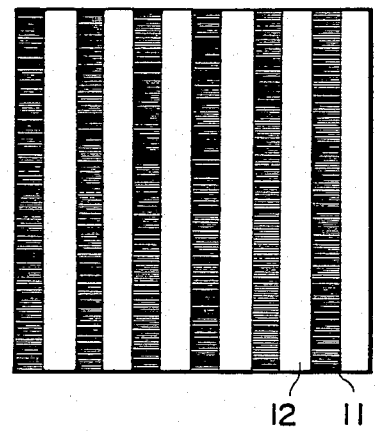
FIG. 1 is a configurational diagram of a combination of the hydrophilically treated portions and the hydrophobically treated portions according to Example 1 of the present invention.

Now, in the following, the function and the resulting effect of the optical member with the surfaces thereof having been treated to have the hydrophobic property and the hydrophilic property in combination will be explained.

The optical member according to the present invention contains therein the hydrophilic regions and the hydrophobic regions in a contiguous relationship to each other. Considering a case, wherein water drops adhere onto the surface of the optical member treated in accordance with the present invention, since the hydrophilic region has a relatively large surface energy, while the hydrophobic portion has a relatively small surface energy, the water drops, due to a difference in the surface energy between the two regions, move instantaneously from the hydrophobic portion to the hydrophilic portion, and pass through the latter to flow out. As the consequence, no water remains at the hydrophobic portion, and there can be realized a viewing field same as that when no water drops are on the surface of the optical member as a whole. Such Phenomenon could not come out by a mere individual treatment for the hydrophilic property alone or the hydrophobic property alone. An excellent anti-blurring property can therefore be realized by utilizing the difference in the surface energy between the hydrophobically treated region(s) and the hydrophilically treated region(s) in combination.

The visible light transmitting substrate to be used for the anti-blurring optical member according to the present invention is not limited to those substrate having transmitting property to all range of visible lights, but it may be those having such transmitting property to a part of the range of the visible lights. As one example of the material for such substrate, there may be listed inorganic materials (particularly, glass) and organic resin materials.

The term "optical member" as used herein is meant to include material that may be employed as a member such as various window panes, mirrors, and others, where transmission and reflection of light are employed.

The technical feature of the optical member according to the present invention resides in the combination of the two treatments to be done on the surface of the optical member to render it hydrophilic and hydrophobic. There are various ways for combining these two treatments. For example: (1) the hydrophobic regions are scattered insularly (or isolatedly) on the hydrophilically treated surface; (2) the hydrophilic treatment is effected on the hydrophobically treated surface in the lattice pattern; and (3) the treatments are done in such a manner that the hydrophilic regions and the hydrophobic regions are alternately arranged in a stripe or scattered pattern. It should of course be understood that the method of combination is not limited to the abovementioned. In either method of combination, the hydrophobically treated regions may be continuous or non-continuous. It is desirable that the hydrophilically treated region(s) be continuous, because such continued arrangement of the hydrophilically treated regions facilitates flow of water.

The pattern design may be selected from various possible configurations, e.g., the strips may be straight or curved, the insular pattern may be round, square or the like, and any combination thereof may be applied. The hydrophilic property and the hydrophobic property are generally evaluated by the contact angle of water on the member, the former providing 0 to 15 degrees and the latter providing at least 70 degrees (preferably at least 80 degrees).

The areal ratio between the hydrophilically treated region(s) and the hydrophobically treated region(s) should preferably be in a range from 1:4 to 4:1 for obtaining the very remarkable effect. Outside this range, the resulting effect of the present invention becomes less remarkable, because one of the treatments will be predominant. An areal ratio from 1:4 to 1:1 is more preferred, and most preferred is from 1:2 to 1:1.

The space interval or the size of both hydrophobic and hydrophilic regions may be determined depending on the place where the optical member is to be used. It is desirable that these regions be of a size substantially equal to the size of the water drops, which may suitably range from about 2 mm to about 8 mm.

The methods for the hydrophobic treatment as referred to herein are as follows:

(1) a method, in which a hydrophilicizing agent of an organic silicon type such as epoxy silane, etc. or a fluorine type such as furan, etc. is applied or sprayed on the surface of the optical member to cover the same;

(2) a method, in which the surface of the optical member is coated with a plasma-polymerized film of a fluorine type such as fluorocarbon, etc.;

(3) a method, in which a thin film such as $CeO_2$, $TiO_2$, $Al_2O_3$, $In_2O_3$, $Bi_2O_3$, $Y_2O_3$ etc. is coated by PVD or CVD; and (4) a method, in which the surface of the glass material is reformed by the ion-implantation and/or ion-irradiation method. It should be noted that method (4) is applicable only to the treatment on inorganic glass. The conditions for the ion-irradiation are as follows: (1) the ion-irradiation energy ranging from 50 keV to 400 keV and the irradiation quantity ranging from $5 \times 10^{14}$ to $1 \times 10^{17}$ ions/cm$^2$ for the irradiation of at least one ion selected from rare gas elements (He, Ne, Ar, Kr and Xe), halogens (F, Cl and Br), metal elements belonging to Groups 3A, 4A, 1B, 2B, 3B, 4B or 5B in the International Periodic Table (Al, Sc, Ti, Cu, Zn, Y, Zr, Ag, Cd, In, Sn, Sb, Au, Hg, Tl, Pb and Bi), and alkali metal or alkaline earth metal elements (Li, Na, K, Rb, Cs, Be, Mg, Ca, Sr and Ba); and (2) the ion-implantation energy ranging from 50 keV to 400 keV and the implantation quantity ranging from $1 \times 10^{17}$ to $1 \times 10^{22}$ ions/cm$^2$ for the implantation of ion of halogens (F, Cl and Br) or metal elements (Al, Ti, Y, Bi or Ce).

The methods for the hydrophilic treatment are as follows:

(1) a method, in which hydrophilic surfactant, polyhydric alcohol, etc. is coated on the surface of the optical member by application or spray;

(2) a method, in which a hydrophilic polymer such as polyacrylic acid, etc. is coated on the surface of the optical member by the plasma polymerization method;

(3) a method, in which a thin film of any one of the compounds selected from $MgF_2$, $CaF_2$ and SiO is coated on the surface of the optical member by PVD or CVD; and (4) a method, in which the surface of glass is subjected to ion-etching by irradiation of a low energy ion. NOTE: This method is applicable only to the treatment on inorganic glass. The conditions for the ion-irradiation are: the irradiation energy of 0.2 to 20 keV and the irradiation quantity of $1 \times 10^{15}$ ions/cm$^2$ or above.

With a view to enabling those persons skilled in the art to put the present invention into practice, the following preferred examples are presented.

EXAMPLE 1

As shown in FIG. 1 of the accompanying drawings, the hydrophobically treated regions 11 and the hydrophilically treated regions 12 are alternately arranged in a stripe pattern on the surface of a sheet glass for automobile window. The space interval (or stripe width) of the stripe pattern is 5 mm. The treatment is done by first coating a thin film of SiO over the entire surface of the glass by means of the PVD to render it hydrophilic, then placing on the thus treated surface a masking in a stripe pattern, thereafter coating epoxy silane as the hydrophobicizing agent, and finally removing the masking.

Taking various situations into consideration, such as rain, etc., water was sprayed on the surface of the glass as treated, and the light-transmission and image deformation through the glass were measured so as to examine its visibility. The results are shown in Table 1 below. The method of testing is in accordance with JIS (Japanese Industrial Standard) R3212 (Item 3.3) and R3202 (Item 5.1) for the light transmitting property and the deformation of image, respectively. In Table 1 below, there are also shown for the sake of comparison the test results of a non-treated glass, an only hydrophobically treated glass, and an only hydrophilically treated glass. Contact angles of water on the hydrophilic region and the hydrophobic region were 5 degrees and 100 degrees, respectively.

TABLE 1

|  | Light Transmission (after spraying of water drops) | Image Deformation (after spraying of water drops) |
| --- | --- | --- |
| Inventive glass | O | O |
| Non-treated glass | X | X |
| Only hydrophobically treated glass | X | O |
| Only hydrophobically treated glass | O | X |

(NOTE)
Light transmission:
O ... 70% or higher
X ... not reaching 70 %
Image deformation:
O ... straight line is not seen deformed
X ... straight line is seen deformed As is apparent from the above Table 1, the treated glass according to the present invention is able to secure a clear viewing field free from deformation. In contrast to this, the non-treated glass, the only hydrophobically treated glass, and the only hydrophilically treated glass cannot produce satisfactory results as to the light transmission and the image deformation.

EXAMPLE 2

Figure 2:
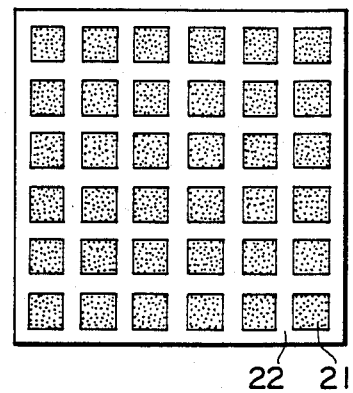
FIG. 2 is a configurational diagram of a combination of the hydrophilically treated portions and the hydrophobically treated portions according to Example 2 of the present invention.

As shown in FIG. 2 of the accompanying drawing, the hydrophilically treated region 22 is formed over the entire surface of borosilicate glass which has been subjected to the hydrophobic treatment. The hydrophobically treated regions 21 are in the form of a square having a size of 5 mm × 5 mm, hence the hydrophilically treated region takes a lattice form having a width of 3 mm. The tests for the light transmission and the image deformation after spraying of water produce good results same as those in Example 1 above.

EXAMPLE 3

Figure 3:
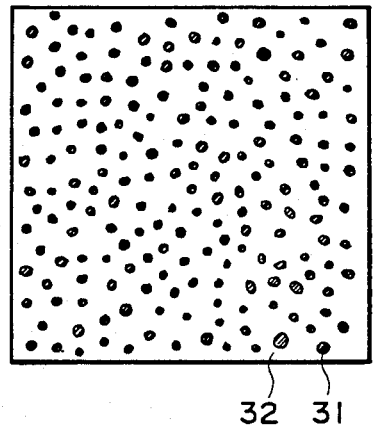
FIG. 3 is a configurational diagram of the hydrophilically treated portions and the hydrophobically treated portions according to Example 3 of the present invention.

As shown in FIG. 3 of the accompanying drawing, the hydrophobically treated regions 31 are formed insularly in a scattered pattern on the surface of an organic glass (methyl methacrylate resin) which has been subjected to the hydrophilic treatment to form a hydrophilic region 32. Each of the islets 31 (the scattered hydrophobic regions) is in a circular form having a diameter of from 2 mm to 5 mm. With the thus treated glass, there can be obtained a clear viewing field free from image deformation, even if water drops adhere onto it as is the case with Examples 1 and 2 above.

In the foregoing, the present invention has been described with particular reference to the preferred examples thereof. It should however be noted these examples are merely illustrative and not so restrictive, and that any changes and modifications in this invention may be made by those persons skilled in the art without departing from the spirit and scope of the invention as recited in the appended claims.

What is claimed is:

1. An anti-blurring optical member, comprising: a visible light transmitting substrate, and at least one hydrophilic region and at least one hydrophobic region formed on said substrate, said hydrophilic and hydrophobic regions being disposed contiguous to each other and said hydrophilic region being of a substantially continuous pattern so as to allow water from said hydrophobic region to flow along said hydrophilic region.

2. An anti-blurring optical member as set forth in claim 1, wherein an areal ratio between the hydrophilic region and hydrophobic region is in a range from 1:4 to 4:1.

3. An anti-blurring optical member as set forth in claim 1, wherein the hydrophilic and hydrophobic regions are disposed in a pattern having a size or interval corresponding to water drops.

4. An anti-blurring optical member as set forth in claim 3, wherein said pattern has a size or interval ranging from about 2 to about 8 mm.

5. An anti-blurring optical member as set forth in claim 3, wherein a plurality of said hydrophobic regions are scattered in said at least one hydrophilic region in an isolated pattern.

6. An anti-blurring optical member as set forth in claim 3, wherein said pattern is of a stripe form.

7. An anti-blurring optical member as set forth in claim 3, wherein said hydrophilic region is formed continuously.

8. An anti-blurring optical member as set forth in claim 2, wherein the areal ration is in a range from 1:4 to 1:1.

9. An anti-blurring optical member as set forth in claim 8, wherein the areal ratio is in a range from 1:2 to 1:1.

10. An anti-blurring optical member as set forth in claim 6, wherein said stripe has a width and interval of about 5 mm.

11. An anti-blurring optical member as set forth in claim 1, wherein said hydrophobic region is formed by ion-implantation and/or ion-irradiation.

12. An anti-blurring optical member as set forth in claim 1, wherein said hydrophobic region is formed by applying a hydrophilicizing agent selected from an organic silicon type or a fluorine type on the surface of said substrate.

13. An anti-blurring optical member as set forth in claim 1, wherein said hydrophobic region is formed by coating the surface of said substrate with a thin film of one selected from the group consisting of $CeO_2$, $TiO_2$, $Al_2O_3$, $In_2O_3$, $Bi_2O_3$, and $Y_2O_3$ by PVD or CVD.

14. An anti-blurring optical member as set forth in claim 1, wherein said hydrophilic region is formed by coating the surface of said substrate with a thin film of any one of the compounds selected from $MgF_2$, $CaF_2$, and SiO by PVD or CVD.

15. An anti-blurring optical member as set forth in claim 1, wherein said hydrophilic region is formed by SiO thin film and said hydrophobic region is formed by epoxy silane coating.

16. An anti-blurring optical member as set forth in claim 1, wherein said substrate is one selected from the group consisting of inorganic materials and organic resin materials.

* * * * *